United States Patent [19]
Nakamura et al.

[11] Patent Number: 5,550,168
[45] Date of Patent: * Aug. 27, 1996

[54] PROCESS FOR PRODUCING MODIFIED POLYISOCYANURATE FOAMS

[75] Inventors: Satoshi Nakamura; Hirokatsu Shirahata, both of Tokyo, Japan

[73] Assignee: Nisshinbo Industries, Inc., Tokyo, Japan

[ * ] Notice: The term of this patent shall not extend beyond the expiration date of Pat. No. 5,321,050.

[21] Appl. No.: 262,531

[22] Filed: Jun. 20, 1994

[30] Foreign Application Priority Data

Dec. 3, 1993 [JP] Japan .................................. 5-339514

[51] Int. Cl.⁶ .............................. C08G 18/00; B01J 31/00
[52] U.S. Cl. ................... 521/108; 252/182.24; 502/162; 502/164; 502/167; 502/170; 502/208; 502/340; 521/125; 521/128; 521/129; 521/155; 521/901; 521/902
[58] Field of Search ..................... 521/125, 108, 521/128, 129, 155, 901, 902; 252/182.24; 502/162, 164, 167, 170, 208, 340

[56] References Cited

U.S. PATENT DOCUMENTS

| | | |
|---|---|---|
| 3,657,161 | 4/1972 | Bernard et al. . |
| 3,887,501 | 6/1975 | Narayan et al. . |
| 3,928,256 | 12/1975 | Cenker et al. . |
| 3,981,829 | 9/1976 | Cenker et al. . |
| 3,994,837 | 11/1976 | Kan et al. . |
| 3,994,839 | 11/1976 | Cenker et al. . |
| 3,998,776 | 12/1976 | Wagener et al. . |
| 4,040,992 | 8/1977 | Bechara et al. . |
| 4,166,164 | 8/1979 | Cenker et al. ..................... 521/129 |
| 4,425,446 | 1/1984 | Malwitz et al. ..................... 521/108 |
| 4,683,249 | 7/1987 | Nakatani et al. ..................... 521/129 |
| 4,767,736 | 8/1988 | Petrella ..................... 521/129 |
| 5,252,624 | 10/1993 | Milliren et al. ..................... 521/129 |
| 5,317,034 | 5/1994 | Nakamura et al. ..................... 521/129 |
| 5,321,050 | 6/1994 | Morimoto et al. ..................... 521/129 |

FOREIGN PATENT DOCUMENTS

| | | |
|---|---|---|
| 0132057 | 1/1985 | European Pat. Off. . |
| 0381324 | 8/1990 | European Pat. Off. . |
| 0585636 | 3/1994 | European Pat. Off. . |
| 7206935 | 10/1972 | France . |
| 46-25017 | 7/1971 | Japan . |
| 46-37503 | 11/1971 | Japan . |

Primary Examiner—James J. Seidleck
Assistant Examiner—John M. Cooney, Jr.
Attorney, Agent, or Firm—Wenderoth, Lind & Ponack

[57] ABSTRACT

A modified polyisocyanurate foam is produced by reacting an organic polyisocyanate, a polyol and water in the presence of three catalyst, i.e. two particular trimerization catalysts and a carbodiimidation catalyst. There can be produced, without using any evaporating type blowing agent, a modified polyisocyanurate foam which is suitably used for continuous production of laminate boards, siding boards, insulation boards, etc.

21 Claims, No Drawings

PROCESS FOR PRODUCING MODIFIED POLYISOCYANURATE FOAMS

This invention relates to a process for producing a modified polyisocyanurate foam and, more particularly, to a process for producing a modified polyisocyanurate foam suitable for continuous production of laminate boards, insulation boards and the like which process does not involve the use of evaporating type blowing agent such as CFC, HCFC, HFC, pentane and methylene chloride.

It is known to produce a modified polyisocyanurate foam by reacting an organic polyisocyanate and a polyol in the presence of a blowing agent and using an trimerization catalyst and a carbodiimidation catalyst in combination (cf., for example, U.S. Pat. No. 3,657,161). It has also been proposed to produce a modified polyisocyanurate foam by reacting an organic polyisocyanate and a polyol in the presence of a blowing agent and using methanol, furfuryl alcohol or phosphorene oxide (carbodiimidation catalyst) and an alkali metal salt (trimerization catalyst) in combination (U.S. Pat. No. 4,166,164, and European Patent No. 381,324). U.S. Pat. No. 3,887,501, U.S. Pat. No. 3,928,256, U.S. Pat. No. 3,998,776, U.S. Pat. No. 3,994,837, U.S. Pat. No. 3,981,829, U.S. Pat. No. 3,994,839 and so on have reported a process for producing modified polyisocyanurate foam using a tertiary amine and an alcohol such as an amino alcohol as cocatalysts, a process in which a Mannich polyol, a phosphorus containing polyol or the like is used catalytically, a method in which s-triazine and phenol are used.

For producing these (modified) polyisocyanurate foams, it is a general measure to use flon as a blowing agent. However, the use of CFCs has a problem of breaking the ozone layer, and in near future the use of CFC and HCFC will be prohibited completely. While there is a possibility to use carbon dioxide gas generated by the reaction between water and isocyanate as a substitute for CFC, this is disadvatageous since increase in the amount of water with view to making low density foam leads to increase in the amount of urea bonds generated (—NCO+H$_2$O→—NH$_2$+CO$_2$ ↑, —NH$_2$+OCN—→—NHCONH—), and therefore there arises a problem of giving only those foams that have low strength, deteriorated dimensional stability, and poor adherability with surface materials. Also, in the above-described conventional method using an trimerization catalyst and a carbodiimidation catalyst in combination, it is difficult to control the reaction when water is used as a blowing agent, and in particular, it is impossible to produce, at economically acceptable speeds, a low density rigid foam which has a free rise density of not more than 40 kg/m$^3$ and a density when molded, of not more than 60 kg/m$^3$, required for laminate boards or insulation boards.

The present inventors made a study on a process which can industrially produce, from an organic polyisocyanate and a polyol without using any evaporating type blowing agent typified by CFCs, a modified polyisocyanurate foam of low density having a free rise density of not more than 40 kg/m$^3$ and a density when molded into a board (said density is hereinafter referred to as "density when molded into a board of 22 mm thickness"), of not more than 60 kg/m$^3$. As a result, it was found that by using a combination of two particular trimerization catalysts and a carbodiimidation catalyst together with water, a trimerization reaction of polyisocyanate, a carbodiimidation reaction of polyisocyanate, a reaction of polyisocyanate and water, etc. proceed quickly at a favorable balance, whereby a modified polyisocyanurate foam of low density having a free rise density of not more than 40 kg/m$^3$, preferably 20–40 kg/m$^3$ and a density when molded into a board, of not more than 60 kg/m$^3$, preferably 30–50 kg/m$^3$ can be obtained in a short time without using any evaporating type blowing agent such as CFC or the like. The finding has led to the completion of the present invention.

According to the present invention, there is provided a process for producing a modified polyisocyanurate foam, which process comprises reacting an organic polyisocyanate, a polyol and water in the presence of:

(a) a trimerization catalyst selected from a hydroxyalkyl quaternary ammonium compound represented by formula (I)

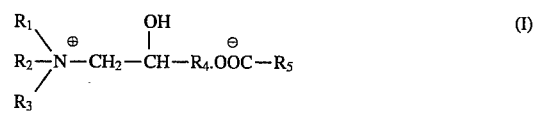

wherein $R_1$, $R_2$ and $R_3$ are each a substituted or unsubstituted alkyl group, and $R_4$ and $R_5$ are each a hydrogen atom or a substituted or unsubstituted alkyl group, and an alkali metal salt of a $C_{1-8}$ aliphatic monocarboxylic acid, represented by formula (II)

wherein $R_6$ is a hydrogen atom or a substituted or unsubstituted $C_{1-7}$ aliphatic hydrocarbon group, and M is an alkali metal, (b) a trimerization catalyst selected from the compounds of formulas (III), (IV), (V) and (VI)

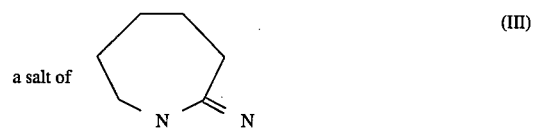

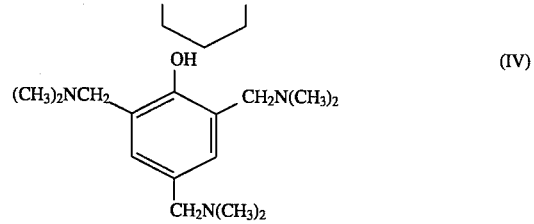

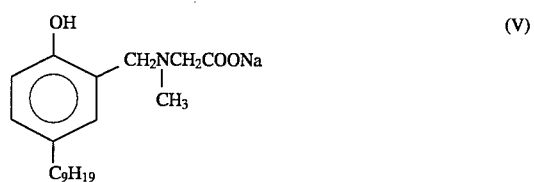

and

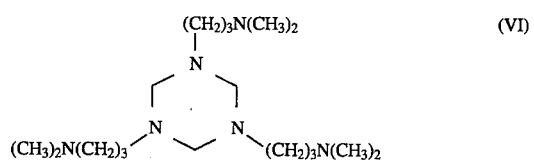

and (c) a carbodiimidation catalyst selected from phosphorene oxides represented by formulas (VII) and (VIII)

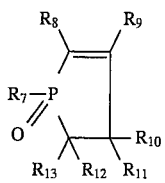

(VII)

and

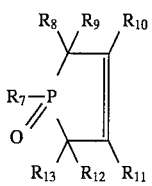

(VIII)

wherein $R_7$ is a substituted or unsubstituted alkyl, phenyl, naphthyl or benzyl group, and $R_8$, $R_9$, $R_{10}$, $R_{11}$, $R_{12}$ and $R_{13}$ are each a hydrogen atom, a chlorine atom or a $C_{1-4}$ alkyl group.

Hereinafter, this invention will be described in more detail.

The organic polyisocyanates used in the process of this invention as starting materials may be any of aliphatic, alicyclic, and aromatic types, and mixtures of these. Those conventionally used in the production of polyurethanes and polyisocyanurates can be used similarly. To be specific, suitable examples thereof include aromatic diisocyanates such as 2,4-tolylene diisocyanate, 2,6-tolylene diisocyanate, crude tolylene diisocyanate, diphenylmethane diisocyanate, and crude diphenylmethane diisocyanate; aromatic triisocyanates such as 4,4', 4"-triphenylmethane triisocyanate, and 2,4,6-tolylene triisocyanate; aromatic tetraisocyanates such as 4,4'-dimethyldiphenylmethane- 2,2', 5,5'-tetraiisocyanate, aliphatic isocyanates such as hexamethylene-1,6-diisocyanate; alicyclic isocyanates such as hydrogenated diphenylmethane diisocyanate; and other diisocyanates such as m-phenylene diisocyanate, naphthylene-1,5-diisocyanate, 1, -methoxyphenyl-2,4-diisocyanate, 4,4'-biphenyl diisocyanate, 3,3'-dimethoxy-4,4'-biphenyl diisocyanate, and 3,3'-dimethyldiphenylmethane-4,4'-diisocyanate. Among them, preferred are 2,4-tolylene diisocyanate, 2,6-tolylene diisocyanate, crude tolylene diisocyanate, diphenylmethane diisocyanate, crude diphenylmethane diisocyanate, hexamethylene-1,6-diisocyanate, hydrogenated diphenylmethane diisocyanate, etc. The above-described organic polyisocyanates may be used singly or two or more of them may be combined.

The polyols include aliphatic, saccharide, aromatic compounds having two or more hydroxyl groups in the molecule, and mixtures thereof, such as polyether polyols, polyester polyols, and castor oil. Those conventionally used in the production of polyurethanes can also be used similarly. Those polyols may be of either lower molecular weight or high molecular weight. Specific examples thereof include, as polyether polyols, those compounds having structures of active hydrogen-containing compounds such as polyhydric alcohols, polyhydric phenols, amines, or polycarboxylic acids to which alkylene oxides are added. As the polyhydric alcohols, there can be cited, for example, dihydric alcohols such as ethylene glycol, propylene glycol, 1,4-butanediol, 1,6-hexanediol, diethylene glycol, and neopentyl glycol; trihydric or higher polyhydric alcohols such as pentaerythritol, and surcrose. As the polyhydric phenols, there can be cited, for example, polyhydric phenols such as pyrogallol, and hydroquinone; bisphenols such as bisphenol A; condensates of phenol and formaldehyde; and so on. As the amines, there can be cited, for example, ammonia, alkanolamines such as mono-, di- and triethanolamines, isopropanolamine, and aminoethylethanolamine; $C_1$-$C_{22}$ alkylamines, $C_2$-$C_6$ alkylenediamines, polyalkylenepolyamines, aromatic amines such as aniline, phenylenediamine, diaminotoluene, xylenediamine, methylenedianiline, and diphenyletherdiamine, alicyclic amines such as isophoronediamine, and cyclohexylenediamine, heterocyclic amines, and so on. As the polycarboxcylic acids, there can be cited, for example, aliphatic polycarboxylic acids such as succinic acid, adipic acid, sebacic acid, maleic acid, and dimeric acid, aromatic polycarboxylic acids such as phthalic acid, terephthalic acid, trimellitic acid, and pyromelitic acid, etc. These active hydrogen-containing compounds may also be used as a mixture of two or more of them. As the alkylene oxides to be added to the active hydrogen-containing compounds, there can be cited, for example, propylene oxide, ethylene oxide, butylene oxide, tetrahydrofuran, etc. These alkylene oxides may be used singly or two or more of them may be used in combination. In the latter case, there may be blocked adducts or randomly added products. As the polyester polyols, there can be cited, for example, condensed polyester polyols obtained by the reaction between polyhydric alcohols (the aforementioned alcohols, trimethylolpropane, glycerol, etc.) and carboxylic acids (the aforementioned polycarboxylic acids, etc.), polyester polyols obtained by ring opening polymerization lactone, scrap PET to which ethylene oxide adduct of nonylphenol is added, and the like. Among them, aliphatic, aromatic, aliphatic or aromatic amine, pentaerythritol, or sucrose based polyether polyols; aromatic or aliphatic carboxylic acid polyester polyols; lactone polyester polyols; etc. are particularly preferred. The aforementioned polyols may be used singly or two or more of them may be used in combination.

The aforementioned polyols may have a hydroxyl number within the range of generally 20 to 600 mgKOH/g, preferably 25 to 500 mgKOH/g, more preferably 50 to 400 mgKOH/g.

According to the process of this invention, polyisocyanurate foams can be generated by the reaction of the aforementioned organic polyisocyanate with the aforementioned polyol together with water as a blowing agent. To perform the reaction, compounding proportions of the organic polyisocyanate, the polyol and water are not limited strictly, and may vary widely depending on desired physical properties and uses of final products of modified polyisocyanurate foams. Generally, it is preferred to react the aforementioned components after blending them such that isocyanate index expressed as NCO/OH equivalent ratio can become within the range of not below 1.8, preferably from 1.8 to 5, more preferably 2 to 4.

The amount of water to be used as a blowing agent can be controlled depending on the density and the like desired for final products of the modified polyisocyanurate foam. In particular, the process of this invention has a feature that a low density rigid foam can be produced by using only water and without using volatile blowing agents. According to the process of this invention, addition of water in amounts within the range of, for example, 0.3 to 1.8% by weight, preferably 0.8 to 1.5% by weight, based on the total weight of organic polyisocyanate, polyol and water enables production of a low density foam having a free rise density of generally not more than 40 kg/m$^3$, preferably 20–30 kg/m$^3$ and a density when molded into a board of 22 mm thickness, of generally not more than 60 kg/m$^3$, preferably 30–50 kg/m$^3$, with ease without using any volatile blowing agent.

The present process is characterized in that the reaction for producing a modified polyisocyanurate foam from the above-mentioned polyisocyanate, the above-mentioned polyol and water is carried out in the presence of the following catalysts:

(a) a trimerization catalyst selected from a hydroxyalkyl quaternary ammonium compound represented by formula (I)

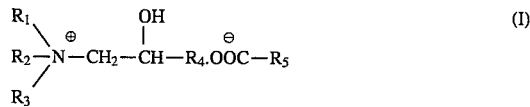

wherein $R_1$, $R_2$ and $R_3$ are each a substituted or unsubstituted alkyl group, and $R_4$ and $R_5$ are each a hydrogen atom or a substituted or unsubstituted alkyl group, and an alkali metal salt of a $C_{1-8}$ aliphatic monocarboxylic acid, represented by formula (II)

$$R_6\text{—COOM} \qquad (II)$$

wherein $R_6$ is a hydrogen atom or a substituted or unsubstituted $C_{1-7}$ aliphatic hydrocarbon group, and M is an alkali metal, (b) a trimerization catalyst selected from the compounds of formulas (III), (IV), (V) and (VI)

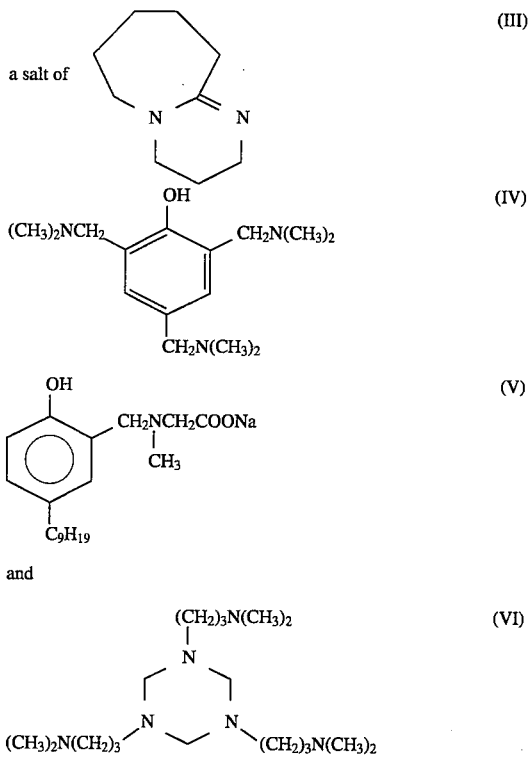

and (c) a carbodiimidation catalyst selected from phosphorene oxides represented by formulas (VII) and (VIII)

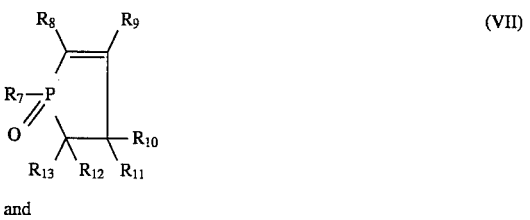

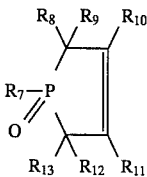

wherein $R_7$ is a substituted or unsubstituted alkyl, phenyl, naphthyl or benzyl group, and $R_8$, $R_9$, $R_{10}$, $R_{11}$, $R_{12}$ and $R_{13}$ are each a hydrogen atom, a chlorine atom or a $C_{1-4}$ alkyl group.

These catalysts are described in more detail below.

Trimerization Catalyst (a)

In formula (I), "alkyl group" may be any of straight chain or branched chain type, and can be exemplified by methyl, ethyl, n-propyl, isopropyl, n-butyl, tert-butyl, n-pentyl, isoamyl, n-hexyl, n-heptyl, 1-ethylpentyl, n-octyl and 2-ethylhexyl. Each of the alkyl groups represented by $R_1$-$R_3$ is preferably a lower alkyl group of six or less carbon atoms, preferably four or less carbon atoms. Each of the alkyl groups represented by $R_4$ and $R_5$ may be not only a lower alkyl group but also a higher alkyl group of up to 18 carbon atoms.

The hydroxyalkyl quaternary ammonium compound of formula (I), used as the trimerization catalyst (a) in the present process is known per se as a catalyst used in production of polyurethane, polyisocyanurate, polyurethane-polyisocyanurate resin, etc. (U.S. Pat. No. 4,040,992). Specific examples thereof include the followings:

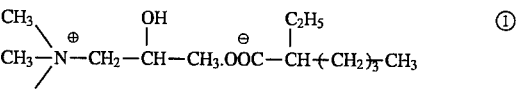

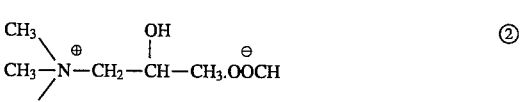

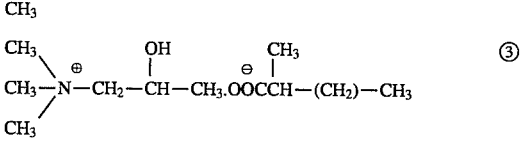

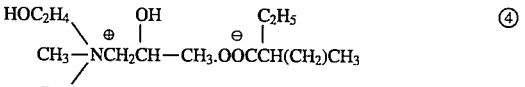

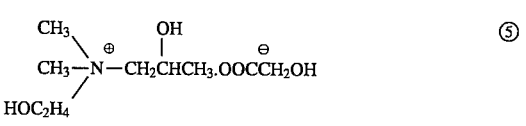

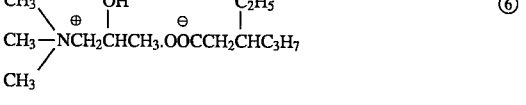

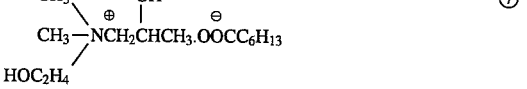

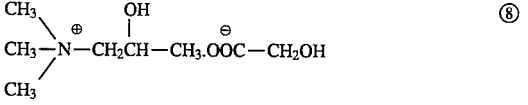

-continued

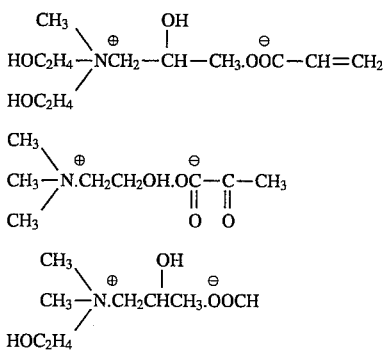

Of these hydroxyalkyl quaternary ammonium compounds, the compounds ① and ② are used preferably.

The alkali metal salt of a $C_{1-8}$ aliphatic monocarboxylic acid, of formula (II) also used as the trimerization catalyst (a) is known per se as a catalyst used in production of polyurethane, polyisocyanurate, polyurethane-polyisocyanurate resin, etc. Specific examples thereof include the followings:

| (1) Potassium acetate | $CH_3COOK$ |
|---|---|
| (2) Potassium 2-ethylhexanoate | $CH_3CH_2CH_2CH_2CHCOOK$<br>\|<br>$C_2H_5$ |
| (3) Potassium propionate | $CH_3CH_2COOK$ |
| (4) Potassium formate | $HCOOK$ |
| (5) Potassium isobutyrate | $(CH_3)_2CHCOOK$ |
| (6) Potassium methacrylate | $CH_2=C-COOK$<br>\|<br>$CH_3$ |
| (7) Potassium surbate | $CH_3CH=CHCH=CHCOOK$ |
| (8) Sodium acetate | $CH_3COONa$ |
| (9) Sodium 2-ethylhexanoate | $CH_3CH_2CH_2CH_2CHCOONa$<br>\|<br>$C_2H_5$ |
| (10) Sodium propionate | $CH_3CH_2COONa$ |
| (11) Sodium butyrate | $CH_3CH_2CH_2COONa$ |
| (12) Sodium formate | $HCOONa$ |
| (13) Sodium caprylate | $CH_3(CH_2)_6COONa$ |

Of these alkali metal salts of $C_{1-8}$ aliphatic monocarboxylic acids, the compounds (1) and (2) are used preferably.

Trimerization Catalyst (b)

Salts of 1,8-diaza-bicyclo[5.4.0]undecene-7 (hereafter abbrebiated as DBU) represented by the above formula (III) are known per se as a catalyst for preparation of polyurethane, polyisocyanurate and polyurehtanepolyisocyanurate resins, etc. (refer to Japanese Patent Publication No. 37503/1971 and Japanese Patent Publication No. 25017/1971), and can be obtained by reaction of DBU with acids such as phenols or fatty acids.

As phenols usable for formation of these salts, there can, for example, be mentioned monohydric phenols such as phenol, cresols, xylenols, naphthols, trimethylphenols, tetramethylphenols, pentamethylphenols, ethylphenols, n- and iso-propylphenols, n- and iso-butylphenols, clclohexylphenols, n- and iso-amylphenols, iso-octylphenols, iso-nonylphenols, iso-dodecylphenols, di- and poly-substituted phenols (for example, thymol, carbacrol, di-iso-alkylphenols) and methoxylphenols (e.g., eugenol, guaiacol); dihydric phenols such as catechols, resorcinols, hydroqinones and bisphenols; and polyhydric phenols such as pyrogallol and phyloroglucinol. Further, as fatty acids, there can, for example, be mentioned saturated fatty acids such as formic acid, acetic acid, propionic acid, butyric acid, valeric acid, caproic acid, enanthic acid, caprylic acid, pelargonic acid, capric acid, undecylic acid, lauric acid, tridecyl acid, myristic acid, pentadecylic acid, palmitic acid, heptadecylic acid and stearic acid; unsaturated fatty acids such as acrylic acid, crotonic acid, iocrotonic acid, undecylenic acid, oleic acid, elaidic acid, cetoleic acid, erucic acid, brassidic acid, sorbic acid, linolic acid, linolenic acid, arachidonic acid, propiolic acid and stearolic acid; isoalkyl fatty acids such as 2-ethylhexanoic acid; oxyfatty acids such as lactic acid, glycolic acid, ricinolic acid and oxystearic acid. In addition, it is also possible to use weak acids such as, for example, benzoic acid, salicylic acid, enolic acid (e.g., barbituric acid), carbonic acid and phosphoric acid. Particularly preferably used among these acids are phenol, 2-ethylhexanoic acid, oleic acid, formic acid, etc.

Any of the compounds (IV), (V) and (VI) each used as the trimerization catalyst (b) is known per se as a catalyst used in production of polyurethane, polyisocyanurate, polyurethane-polyisocyanurate resin, etc.

Incidentally, the trimerization catalyst (a) used in the present process generally has a degree of trimerization of more than 15%, and the trimerization catalyst (b) generally has a trimerization ratio of not more than 15%. Herein, the degree of trimerization is a value measured by the method of C. M. Bartish et al. [SPI Summary, pp. 157–162 (1989)].

Carbodiimidation Catalyst (c)

On the other hand, as for the compounds represented by the formula (VII) or (VIII) used in combination with the aforementioned trimerization catalysts (a) and (b), the alkyl group represented by $R_7$ may be either straight chain or branched chain, or partially substituted with halogen or other functional groups. Examples of such an alkyl group include methyl, ethyl, propyl, isopropyl, n-butyl, tert-butyl, 2-phenylethyl, 2-chloroethyl, 2-methoxyethyl, etc. groups. The substituted or unsubstituted phenyl, naphthyl and benzyl group include benzyl, phenyl, o-, p- or m-tolyl, xylyl, naphthyl, 4-diphenyl, o-, p- or m-chlorphenyl, etc. $R_7$ may preferably be a $C_1$-$C_4$ alkyl group, a phenyl group, or a benzyl group. The groups represented $R_8$-$R_{13}$ of formula (VII) or (VIII) include hydrogen, chlorine, methyl, ethyl, propyl, isopropyl, butyl, etc., preferably hydrogen and methyl.

Specific examples of phosphorene oxide represented by formula (VII) or (VIII) include the following: 1-methylphosphorene oxide, 3-methyl-1-phenylphosphorene oxide, 3-methyl-1-benzyl-phosphorene oxide, 3-methyl-1-ethylphosphorene oxide, 3-methyl-1-ethylphenylphosphorene oxide, 1-phenyl-3-(4-methyl-3-pentenyl)phosphorene oxide, 1-phenyl-3-chlorophosphorene oxide, etc. Among these phosphorene oxides, especially 3-methyl-1-phenylphosphorene oxide, 3-methyl-1-phenyl-2-phosphorene oxide and 3-methyl-1-phenyl-3-phosphorene oxide are used suitably. These phosphorene oxides are known per se as a catalyst for accelerating the reaction for producing carbodiimide linkage form organic isocyanates (cf., for example, U.S. Pat. No. 3,657,161).

Production of Modified Polyisocyanurate Foam

The present invention is characterized in that in producing a modified polyisocyanurate foam from an organic polyisocyanate, a polyol and water, there is used, as a catalyst, a combination of the three catalysts, i.e. the trimerization catalyst (a), the trimerization catalyst (b) and the carbodiimidation catalyst (c). By using a combination of the three catalysts, it has been made possible to industrially produce a modified polyisocyanurate foam of low density without using any evaporating type blowing agent such as CFC or the like which has problems.

The amounts of the trimerization catalyst (a), the trimerization catalyst (b) and the carbodiimidation catalyst (c) used are not strictly restricted and can be varied depending upon the reaction conditions used, etc. However, the preferable amount of the trimerization catalyst (a) is generally 0.1–10% by weight, particularly 0.5–5% by weight based on the weight of the organic polyisocyanate; the preferable amount of the trimerization catalyst (b) is generally 0.1–5% by weight, particularly 0.5–3% by weight on the same basis; and the appropriate amount of the carbodiimidation catalyst (c) is generally 0.05–5% by weight, particularly 0.1–2% by weight on the same basis.

The relative proportions of the trimerization catalyst (a) and the trimerization catalyst (b) and the relative proportions of [the trimerization catalyst (a)+the trimerization catalyst (b)] and the carbodiimidation catalyst (c) can be varied in a wide range, depending upon the desired properties of final product, etc. However, the preferable weight ratio of [the trimerization catalyst (a)]/[the trimerization catalyst (b)] is generally 0.3/1 to 20/1, particularly 1/1 to 15/1. When the ratio is smaller than 0.3/1, the resulting foam has low curing, which adversely affects the production of boards; further, the resulting foam has a low trimerization ratio and consequently low flame retardancy. When the ratio is larger than 20/1, it is difficult to control the reaction and the resulting foam has inferior flowability. Specifically, the resulting foam has a high overpack ratio (50% or higher) [the overpack ratio indicates the proportions of a free rise density and a density when molded into a board and is defined by (density when molded into board/free rise density—1)×100] and has deteriorated properties in dimensional stability, etc.

The desirable weight ratio of [the trimerization catalyst (a)+trimerization catalyst (b)]/[the carbodiimidation catalyst (c)] is generally 1/1 to 25/1, particularly 2/1 to 15/1. When the ratio is smaller than 1/1, the resulting foam has a high overpack ratio. When the ratio is larger than 25/1, it is difficult to obtain a foam of low density. The overpack ratio is preferably 15–50%, particularly preferably 20–35%.

In the process of this invention, there can be used various additives in combination in amounts usually used. Such additives include, for example, urethanation catalysts (for example, triethylenediamine, dimethylethanolamine, triethylamine, trimethylaminoethylethanolamine, dimethylaminoethylether, pentamethyldiethylenetriaime, N-methylmorpholine, dibutyltin dilaurate, tin octanoate, lead octanoate, etc.), surfactants (for example, dimethylsiloxane/polyether block copolymer, etc.), crosslinking and chain extender agent (for example, ethylene glycol, propylene glycol, 1,4-butanediol, 1,6-hexanediol, diethylene glycol, triethanolamine, diethanolamine, ethylenediamine, toluenediamine, etc.), flame retardants (for example, triphenyl phosphate, triethyl phosphate, trimethyl phosphate, cresyldiphenyl phosphate, tris(cresyl) phosphate, tris(chloroethyl) phosphate, tris(dichloropropyl) phosphate, tris(β-chloropropyl) phosphate, tris(β-chloroethyl) phosphate, tris(2,3-dibromopropyl) phosphate, tris(bromocresyl) phosphate, melamine, antimony triolxide, etc.), colorants, etc.

As the process for producing modified polyisocyanurate foams from the components described above, there can be cited, for example, a process in which first there are provided an isocyanate component composed of the aforementioned organic polyisocyanate or an isocyanate-terminated prepolymer component obtained by reacting an organic polyisocyanate with a polyol, and a polyol component composed of the above-described polyol, water, trimerization catalysts (a) and (b), and carbodiimidation catalyst, and optionally one or more of the urethanation catalyst, surfactant, crosslinking agent, flame retardant, colorant and other additives, and then upon use, the both components are put together, rapidly stirred and mixed. The resulting mixture is foamed and cured.

It is sufficient to set the reaction temperature at room temperature. In some cases, the reaction temperature may be elevated up to a temperature of about 90° C.

Hereinafter, this invention will be illustrated more concretely, by Examples.

EXAMPLES 1–29 and COMPARATIVE EXAMPLES 1–10

There were mixed 25 g (50 g in the case of Example 29) of a polyol portion prepared by mixing a polyol, water, catalysts, a foam-controlling agent and a flame retardant in amounts shown in Table 1, and 75 g (50 g in the case of Example 29) of crude MDI (diphenylmethane diisocyanate). The mixture was stirred by the use of a hand drill (2,200 rpm, agitating blade=30 mm in diameter) for 5 seconds. 80 g of the resulting material was poured into a wooden case of 150 mm×150 mm×150 mm and measured for the cream time and rise time. The time from a liquid state to initiation of foaming was taken as the cream time, and the time to completion of foaming was taken as the rise time. One minute later, the foam was touched to judge the curing state of the surface. The center portion of the cured foam was cut out in a size of about 100 mm×100 mm×100 mm, and the cut-out portion was measured for the volume and weight to calculate its free rise density.

To examine the flowability of foam, the same polyol portion and the same crude MDI were mixed and stirred in the same manner as above. 50 g of the resulting material was poured into a mold of 350 mm×150 mm×22 mm [one side (150 mm×22) was open]. The cured foam was cut in a size of 200 mm×150 mm×22 mm, and the cut portion was measured for the volume and the weight to calculate its 22 mm t free rise density. Using a formula of [(22 mm t free rise density)/(free rise density)-1]×100, the overpack ratio of the cured foam was calculated.

The results are shown in Table 1. The values in parentheses in the table show the amounts of effective ingredients.

TABLE 1

|  | Example | | | | | | | | | |
|---|---|---|---|---|---|---|---|---|---|---|
|  | 1 | 2 | 3 | 4 | 5 | 6 | 7 | 8 | 9 | 10 |
| Polyol[(1)] | | | | | | | | | | |
| Polyol A | 16.0 | 16.0 | 16.0 | 16.0 | 16.0 | 16.0 | 16.0 | 16.0 | 16.0 | 16.0 |
| Polyol B | | | | | | | | | | |
| Polyol C | | | | | | | | | | |
| Polyol D | | | | | | | | | | |

TABLE 1-continued

| | | | | | | | | | | |
|---|---|---|---|---|---|---|---|---|---|---|
| Polyol E | | | | | | | | | | |
| Water | 1.2 | 1.2 | 1.2 | 1.2 | 1.2 | 1.2 | 1.2 | 1.2 | 1.2 | 1.2 |
| Catalyst[(2)] | | | | | | | | | | |
| Trimerization catalyst (a) | | | | | | | | | | |
| DABCO TMR | 1.5 (1.13) | 1.5 (1.13) | 1.5 (1.13) | 1.5 (1.13) | 1.5 (1.13) | | | | | |
| DABCO TMR 2 | | | | | | 2.0 (1.0) | 2.0 (1.0) | | | |
| DABCO K-15 | | | | | | | | 1.5 (1.07) | 1.5 (1.07) | 1.5 (1.07) |
| Polycat 46 | | | | | | | | | | |
| Trimerization catalyst (b) | | | | | | | | | | |
| Polycat SA-1 | 0.2 | | | | | 0.5 | | 0.1 | | |
| Polycat SA-102 | | 0.2 | | | | | | | 0.15 | |
| Curithene 52 | | | 0.2 (0.1) | | | | 0.5 (0.25) | | | 0.2 (0.1) |
| DMP-30 | | | | 0.1 | | | | | | |
| Polycat 41 | | | | | 0.1 | | | | | |
| Urethanation catalyst | | | | | | | | | | |
| DMEA | | | | | | | | | | |
| TEDA | | | | | | | | | | |
| carbodiimidation Catalyst | | | | | | | | | | |
| 3-Methyl-1-phenyl-2-phosphorene oxide | 0.5 | 0.5 | 0.5 | 0.5 | 0.5 | 0.5 | 0.5 | 0.5 | 0.5 | 0.5 |
| 3-Methyl-1-phenyl-3-phosphorene oxide | | | | | | | | | | |
| Surfactant[(3)] | 0.5 | 0.5 | 0.5 | 0.5 | 0.5 | 0.5 | 0.5 | 0.5 | 0.5 | 0.5 |
| Flame retardant[(4)] | 5.1 | 5.1 | 5.1 | 5.2 | 5.2 | 4.3 | 4.3 | 5.2 | 5.15 | 5.1 |
| Polyol component (total of the above) | 25.0 | 25.0 | 25.0 | 25.0 | 25.0 | 25.0 | 25.0 | 25.0 | 25.0 | 25.0 |
| Crude MDI | 75.0 | 75.0 | 75.0 | 75.0 | 75.0 | 75.0 | 75.0 | 75.0 | 75.0 | 75.0 |
| Isocyanate index | 2.40 | 2.40 | 2.40 | 2.40 | 2.40 | 2.40 | 2.40 | 2.40 | 2.40 | 2.40 |
| Cream time (sec) | 8 | 10 | 11 | 8 | 8 | 9 | 10 | 9 | 10 | 11 |
| Rise time (sec) | 29 | 30 | 32 | 33 | 31 | 28 | 31 | 30 | 30 | 31 |
| Curing state of one minute later | ○ | ○ | ○ | ○ | ○ | ○ | ○ | ○ | ○ | ○ |
| Free rise density (kg/m$^3$) | 22.5 | 24.0 | 23.0 | 22.5 | 23.0 | 24.5 | 25.0 | 24.0 | 25.0 | 24.0 |
| 22 mm t free rise density (kg/m$^3$) | 29.5 | 32.0 | 32.5 | 31.5 | 32.0 | 31.5 | 33.0 | 33.0 | 33.5 | 34.0 |
| Overpack ratio (%) | 31 | 33 | 41 | 40 | 39 | 29 | 32 | 38 | 34 | 42 |
| [Trimerization catalyst (a)]/[Trimerization catalyst (b)] | 5.65 | 5.65 | 11.3 | 11.3 | 11.3 | 2 | 4 | 10.7 | 7.13 | 10.7 |

| | Example | | | | | | | | | |
|---|---|---|---|---|---|---|---|---|---|---|
| | 11 | 12 | 13 | 14 | 15 | 16 | 17 | 18 | 19 | 20 |
| Polyol[(1)] | | | | | | | | | | |
| Polyol A | 16.0 | 16.0 | 16.0 | 16.0 | 16.0 | 16.0 | 16.0 | 16.0 | 16.0 | 16.0 |
| Polyol B | | | | | | | | | | |
| Polyol C | | | | | | | | | | |
| Polyol D | | | | | | | | | | |
| Polyol E | | | | | | | | | | |
| Water | 1.2 | 1.2 | 1.2 | 1.2 | 1.2 | 1.2 | 1.2 | 1.2 | 1.2 | 1.2 |
| Catalyst[(2)] | | | | | | | | | | |
| Trimerization catalyst (a) | | | | | | | | | | |
| DABCO TMR | | | | | | | | | | |
| DABCO TMR 2 | | | | | | | | | | |
| DABCO K-15 | 1.5 (1.07) | 1.5 (1.07) | | | | 1.5 (1.07) | 1.0 (0.71) | 1.0 (0.71) | 1.0 (0.71) | 1.0 (0.71) |
| Polycat 46 | | | 2.0 (0.76) | 2.0 (0.76) | 2.0 (0.76) | | | | | |
| Trimerization catalyst (b) | | | | | | | | | | |
| Polycat SA-1 | | | | | | | | | | |
| Polycat SA-102 | | | 0.2 | | | | | | | |
| Curithene 52 | | | | 0.2 (0.1) | | | | 1.5 (0.75) | 1.0 (0.50) | 0.8 (0.4) |
| DW-30 | 0.1 | | | | 0.1 | 0.5 | 1.0 | | | |
| Polycat 41 | | 0.1 | | | | | | | | |

TABLE 1-continued

| | | | | | | | | | | |
|---|---|---|---|---|---|---|---|---|---|---|
| Urethanation catalyst | | | | | | | | | | |
| DMEA | | | | | | | | | 0.1 | |
| TEDA | | | | | | | | | | 0.1 |
| carbodiimidation Catalyst | | | | | | | | | | |
| 3-Methyl-1-phenyl-2-phosphorene oxide | 0.5 | 0.5 | 0.5 | 0.5 | 0.5 | 0.5 | 0.5 | 0.5 | 0.5 | 0.5 |
| 3-Methyl-1-phenyl-3-phosphorene oxide | | | | | | | | | | |
| Surfactant[3] | 0.5 | 0.5 | 0.5 | 0.5 | 0.5 | 0.5 | 0.5 | 0.5 | 0.5 | 0.5 |
| Flame retardant[4] | 5.2 | 5.2 | 4.6 | 4.6 | 4.7 | 4.8 | 4.8 | 4.3 | 4.3 | 4.9 |
| Polyol component (total of the above) | 25.0 | 25.0 | 25.0 | 25.0 | 25.0 | 25.0 | 25.0 | 25.0 | 25.0 | 25.0 |
| Crude MDI | 75.0 | 75.0 | 75.0 | 75.0 | 75.0 | 75.0 | 75.0 | 75.0 | 75.0 | 75.0 |
| Isocyanate index | 2.40 | 2.40 | 2.40 | 2.40 | 2.40 | 2.40 | 2.40 | 2.40 | 2.40 | 2.40 |
| Cream time (sec) | 8 | 10 | 11 | 12 | 9 | 6 | 5 | 12 | 10 | 10 |
| Rise time (sec) | 32 | 34 | 32 | 34 | 36 | 30 | 48 | 30 | 30 | 29 |
| Curing state of one minute later | ○ | ○ | ○ | ○ | ○ | ○ | ○ | ○ | ○ | ○ |
| Free rise density (kg/m³) | 23.0 | 23.0 | 24.0 | 24.0 | 23.5 | 21.5 | 21.0 | 25.0 | 23.0 | 23.0 |
| 22 mm t free rise density (kg/m³) | 32.5 | 31.0 | 32.0 | 32.5 | 32.0 | 28.0 | 27.5 | 31.5 | 30.5 | 30.5 |
| Overpack ratio (%) | 41 | 37 | 33 | 35 | 36 | 30.0 | 31 | 26 | 33 | 33 |
| [Trimerization catalyst (a)]/[Trimerization L-Catalyst (b)] | 10.7 | 10.7 | 3.8 | 7.6 | 7.6 | 2.14 | 0.71 | 0.95 | 0.42 | 1.78 |

| | Example | | | | | | | | |
|---|---|---|---|---|---|---|---|---|---|
| | 21 | 22 | 23 | 24 | 25 | 26 | 27 | 28 | 29 |
| Polyol[1] | | | | | | | | | |
| Polyol A | 16.0 | 16.0 | 16.0 | 16.0 | 16.0 | | | | 16.0 |
| Polyol B | | | | | | 16.0 | | | |
| Polyol C | | | | | | | 16.0 | | |
| Polyol D | | | | | | | | 16.0 | |
| Polyol E | | | | | | | | | 25.0 |
| Water | 1.2 | 0.8 | 0.8 | 0.8 | 0.8 | 1.2 | 1.2 | 1.2 | 0.8 |
| Catalyst[2] | | | | | | | | | |
| Trimerization catalyst (a) | | | | | | | | | |
| DABCO TMR | | 1.5 (1.13) | | | | | | | |
| DABCO TMR 2 | 1.5 (1.07) | | 1.5 (0.76) | | 1.8 (1.28) | 1.5 (1.07) | 1.0 (0.71) | 1.5 (1.07) | 1.8 (1.28) |
| DABCO K-15 | | | | | | | | | |
| Polycat 46 | | | | 2.0 (0.76) | | | | | |
| Trimerization catalyst (b) | | | | | | | | | |
| Polycat SA-1 | | | | | | | | | |
| Polycat SA-102 | | | | | | | | | |
| Curithene 52 | | | 0.2 (0.1) | | | | | | 0.2 (0.1) |
| DMP-30 | 0.1 | 0.1 | | | 0.1 | 0.2 | 0.2 | 0.1 | |
| Polycat 41 | | | | 0.1 | | | | | |
| Urethanation catalyst | | | | | | | | | |
| DMEA | | | | | | | | | |
| TEDA | | | | | | | | | |
| carbodiimidation Catalyst | | | | | | | | | |
| 3-Methyl-1-phenyl-2-phosphorene oxide | | 0.4 | 0.4 | 0.4 | 1.0 | 0.5 | 0.5 | 0.5 | 0.5 |
| 3-Methyl-1-phenyl-3-phosphorene oxide | 0.5 | | | | | | | | |
| Surfactant[3] | 0.5 | 1.0 | 1.0 | 1.0 | 0.5 | 0.5 | 0.5 | 0.5 | 0.5 |
| Flame retardant[4] | 5.2 | 5.2 | 5.1 | 4.7 | 4.8 | 4.9 | 5.6 | 5.2 | 5.2 |
| Polyol component (total of the above) | 25.0 | 25.0 | 25.0 | 25.0 | 25.0 | 25.0 | 25.0 | 25.0 | 50.0 |
| Crude MDI | 75.0 | 75.0 | 75.0 | 75.0 | 75.0 | 75.0 | 75.0 | 75.0 | 50.0 |
| Isocyanate index | 2.40 | 3.00 | 3.00 | 3.00 | 3.00 | 2.14 | 2.14 | 2.17 | 1.87 |
| Cream time (sec) | 8 | 7 | 10 | 8 | 7 | 9 | 7 | 9 | 8 |
| Rise time (sec) | 33 | 33 | 30 | 36 | 30 | 32 | 31 | 33 | 30 |
| Curing state of one minute later | ○ | ○ | ○ | ○ | ○ | ○ | ○ | ○ | ○ |
| Free rise density (kg/m³) | 23.0 | 37.0 | 36.0 | 38.5 | 22.5 | 24.0 | 23.0 | 24.0 | 28.0 |

TABLE 1-continued

| | | | | | | | | | |
|---|---|---|---|---|---|---|---|---|---|
| 22 mm t free rise density (kg/m³) | 32.0 | 48.5 | 49.5 | 50.0 | 33.5 | 32.5 | 31.0 | 33.5 | 41.0 |
| Overpack ratio (%) | 39 | 31 | 38 | 30 | 49 | 35 | 35 | 40 | 46 |
| [Trimerization catalyst (a)]/[Trimerization catalyst (b)] | 10.7 | 11.3 | 10.7 | 7.6 | 12.8 | 5.35 | 3.55 | 10.7 | 12.8 |

| | Comparative Example | | | | | | | | | |
|---|---|---|---|---|---|---|---|---|---|---|
| | 1 | 2 | 3 | 4 | 5 | 6 | 7 | 8 | 9 | 10 |
| Polyol[(1)] | | | | | | | | | | |
| Polyol A | 16.0 | 16.0 | 16.0 | 16.0 | 16.0 | 16.0 | 16.0 | 16.0 | 16.0 | 16.0 |
| Polyol B | | | | | | | | | | |
| Polyol C | | | | | | | | | | |
| Polyol D | | | | | | | | | | |
| Polyol E | | | | | | | | | | |
| Water | 1.2 | 1.2 | 1.2 | 1.2 | 1.2 | 1.2 | 1.2 | 1.2 | 1.2 | 1.2 |
| Catalyst[(2)] | | | | | | | | | | |
| Trimerization catalyst (a) | | | | | | | | | | |
| DABCO TMR | 1.5 (1.13) | 1.5 (1.13) | 1.5 (1.13) | | | | | | | |
| DABCO TMR 2 | | | | | | | | | | |
| DABCO K-15 | 0.8 (0.57) | | | | | | | | 1.5 (1.07) | |
| Polycat 46 | | 0.5 (0.19) | | | | | | | | |
| Trimerization catalyst (b) | | | | | | | | | | |
| Polycat SA-1 | | | | | | | | | | |
| Polycat SA-102 | | | | 1.6 | | | | 1.6 | | |
| Curithene 52 | | | | | 2.0 (1.0) | | | | | 2.0 (1.0) |
| DMP-30 | | | | | | 2.2 | | 0.5 | | 1.0 |
| Polycat 41 | | | | | | | 1.8 | | | |
| Urethanation catalyst | | | | | | | | | | |
| DMEA | | 0.3 | 0.2 | 0.3 | 0.1 | | | | 0.3 | |
| TEDA | | | | | | | | | | |
| carbodiimidation Catalyst | | | | | | | | | | |
| 3-Methyl-1-phenyl-2-phosphorene oxide | 0.5 | 0.5 | 0.5 | 0.5 | 0.5 | 0.5 | 0.5 | 0.5 | 0.4 | 0.5 |
| 3-Methyl-1-phenyl-3-phosphorene oxide | | | | | | | | | | |
| Surfactant[(3)] | 0.5 | 0.5 | 0.5 | 0.5 | 0.5 | 0.5 | 0.5 | 0.5 | 0.5 | 0.5 |
| Flame retardant[(4)] | 4.5 | 4.8 | 5.0 | 5.0 | 5.4 | 4.5 | 5.0 | 4.7 | 5.1 | 3.8 |
| Polyol component (total of the above) | 25.0 | 25.0 | 25.0 | 25.0 | 25.0 | 25.0 | 25.0 | 25.0 | 25.0 | 25.0 |
| Crude MDI | 75.0 | 75.0 | 75.0 | 75.0 | 75.0 | 75.0 | 75.0 | 75.0 | 75.0 | 75.0 |
| Isocyanate index | 2.40 | 2.40 | 2.40 | 2.40 | 2.40 | 2.40 | 2.40 | 2.40 | 2.40 | 2.40 |
| Cream time (sec) | 9 | 10 | 8 | 6 | 8 | 3 | 4 | 5 | 8 | 11 |
| Rise time (sec) | 26 | 30 | 28 | 34 | 50 | 70 | 79 | 71 | 34 | 68 |
| Curing state of one minute later | O | O | O | O | X | X | X | X | O | X |
| Free rise density (kg/m³) | 24.0 | 24.0 | 21.0 | 27.0 | 22.5 | 20.0 | 21.5 | 20.0 | 23.0 | 24.0 |
| 22 mm t free rise density (kg/m³) | 38.5 | 39.0 | 34.5 | 42.5 | 31.5 | 33.0 | 31.0 | 32.0 | 36.5 | 33.5 |
| Overpack ratio (%) | 60 | 63 | 64 | 57 | 40 | 65 | 44 | 60 | 59 | 40 |

Notes for Table 1
Polyol[(1)]:
Polyol A: a phthalic acid type polyol having a hydroxyl value of 315 (APP-315 manufactured by Union Carbide)
Polyol B: a pentaerythritol type polyol having a hydroxyl value of 410 (410 NE manufactured by Asahi Glass Co., Ltd.)
Polyol C: a sugar aromatic amine type polyol having a hydroxyl value of 410 (RX-403 manufactured by Sanyo Chemical Industries)
Polyol D: an aliphatic polyol having a hydroxyl value of 400 (GP-400 manufactured by Sanyo Chemical Industries)
Polyol E: an aliphatic polyol having a hydroxyl value of 28.5 (FA-718 manufactured by Sanyo Chemical Industries)

TABLE 1-continued

Catalyst[2]:
DABCO TMR:

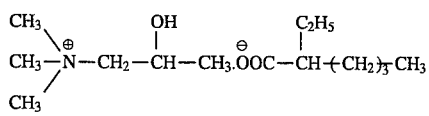

(trimerization catalyst, effective component = 75%)

DABCO TMR 2:

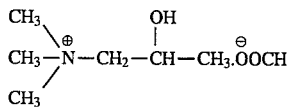

(trimerization catalyst, effective component = 50%)

DABCO K-15: a solution of 70% potassium 2-ethylhexanoate in diethylene glycol (trimerization catalyst)
Polycat 46: a solution of 40% potassium acetate in ethylene glycol (trimerization catalyst)
Polycat SA-1:

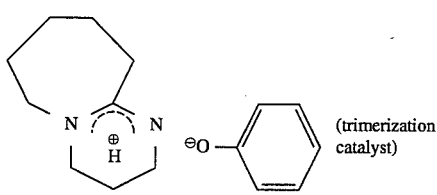 (trimerization catalyst)

Polycat SA-102:

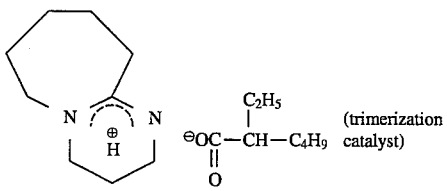 (trimerization catalyst)

Curithene 52:

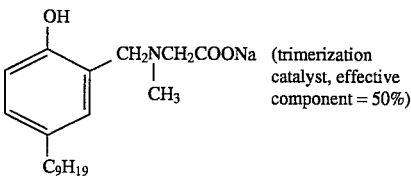 (trimerization catalyst, effective component = 50%)

DMP-30:

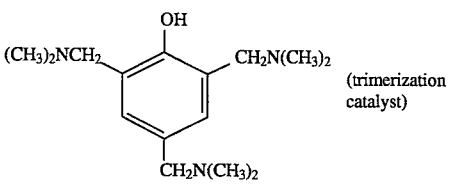 (trimerization catalyst)

Polycat 41:

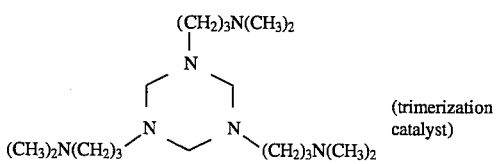 (trimerization catalyst)

TABLE 1-continued

DMEA: $(CH_3)_2NCH_2CH_2OH$ (urethanation catalyst)
TEDA:

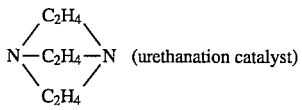

(urethanation catalyst)

3-Methyl-1-phenyl-2-phosphorene oxide:

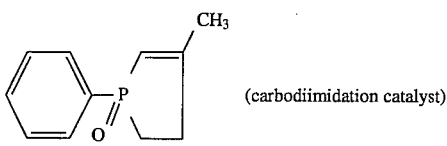

(carbodiimidation catalyst)

3-Methyl-1-phenyl-3-phosphorene oxide:

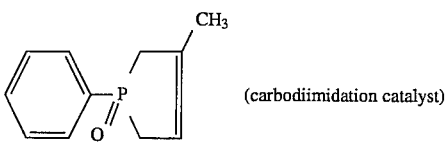

(carbodiimidation catalyst)

Surfactant (3):
A dimethylsiloxane-polyether block copolymer (SZ-1627 manufactured by Nippon Unicar)
Flame retardant (4):
Tris(β-chloropropyl) phosphate (Fyrol PCF manufactured by Akzo Kashima)

The free rise foams and the foams each molded into a 25 mm t board, obtained in Examples 1 and 23 were measured for properties. The results are shown in Table 2.

TABLE 2

| | | Foams of Example 1 | | Foams of Example 23 | | Test method, |
| Item | Unit | Free rise | Molded into board | Free rise | Molded into board | test conditions, etc. |
| --- | --- | --- | --- | --- | --- | --- |
| Density* | kg/m³ | 22.5 | 31 | 36.0 | 50 | JIS A 9514 |
| Compression strength | | | | | | |
| Parallel to rise | kg/cm² | 1.4 | — | 2.4 | — | JIS A 9514 |
| Perpendicular to rise | | 0.7 | — | 1.0 | — | |
| Thickness | | — | 1.7 | — | 2.1 | |
| Bending strength | | | | | | |
| Parallel to rise | kg/cm² | 2.1 | 2.4 | 4.2 | 3.1 | JIS A 9514 |
| Peeling strength | | | | | | |
| Aluminum | kg/5 cm | — | 2.4 | — | — | Cross head speed = 5 mm/min |
| Paper | kg/10 cm | — | 1.3 | — | — | |
| Adhesion strength | | | | | | |
| Iron | kg/cm² | — | — | — | 1.4 | Cross head speed = 5 mm/min |
| Thermal conductivity | kcal/m · hr · °C. | 0.0281 | 0.0255 | 0.0243 | 0.0202 | JIS A 9514 |
| Oxygen index | — | 24.0 | 24.5 | 25.5 | 25.5 | JIS K 7201 |
| Closed cell content | % | 7 | 15 | 85 | 93 | ASTM D 1940 |
| Water absorption | g/100 cm² | 0.63 | 0.51 | 1.4 | 1.2 | JIS A 9514 |
| High-temp. dimensional stability | | | | | | |
| Parallel to rise | % | −0.21 | −0.12 | −0.45 | −0.38 | 80 mm × 80 mm × 50 mm |

TABLE 2-continued

| Item | Unit | Foams of Example 1 Free rise | Foams of Example 1 Molded into board | Foams of Example 23 Free rise | Foams of Example 23 Molded into board | Test method, test conditions, etc. |
|---|---|---|---|---|---|---|
| Perpendicular to rise | | −0.21 | −0.18 | −0.12 | −0.21 | 80° C. × 24 hr |
| Low-temp. dimensional stability | | | | | | |
| Parallel to rise | % | −0.13 | −0.03 | −0.31 | −0.02 | 80 mm × 80 mm × 50 mm |
| Perpendicular to rise | | −0.11 | −0.05 | −0.21 | −0.05 | −20° C. × 24 hr |
| Thermal and humed dimensional stability | | | | | | |
| Parallel to rise | % | −0.38 | −0.21 | −0.31 | +0.21 | 80 mm × 80 mm × 50 mm 80° C., |
| Perpendicular to rise | | −0.41 | −0.31 | −0.35 | +0.22 | 90% R.H. × 24 hr |
| Grade 3 burning test | | | | | | |
| Tdθ | °C., min | — | 160 | — | 87 | JIS A 1321 |
| Ca | | — | 108 | — | 91 | |
| After-flame | sec | — | 28 | — | 24 | |

Molding conditions:
Free rise : 150 mm × 150 mm × 150 mm wooden case
Molded into board : 260 mm × 260 mm × 25 mm aluminum mold
Mold temperature = 40° C.
* = density refers to core density for free rise foams, and to molding density for boards.

EXAMPLE 30

The Example 1 composition shown in Table 1 was applied to a continuous production line for siding board.

Foaming machine: low-pressure foaming machine, G-05 (own product), of forced agitation type, out put= 3.1 kg/min Double conveyor: length=18 m, speed=15 m/min Cutter: movable type circular saw (cutting was made in one minute and 30 seconds after feeing)

Molding: top surface=aluminum docrative sheet of 0.32 mm in thickness, under surface=aluminum kraft paper Molding dimension: width=350 mm, thickness=18 mm Temperatures: polyol portion=25° C., isocyanate portion= 40° C., surface materials=30° C., conveyor=70° C.

Continuous molding was conducted under the above conditions. As a result, there was no problem in filling, curing and cutting. As for the molding, there was no problem in warpage, contraction, adhesion to paper and aluminum sheet, etc.

Main properties of molding:
Foam density=30.5 kg/cm³
Peeling strength=1.8 kg/10 cm
Oxygen index=24.5
Compression strength=1.4 kg/cm².

What is claimed is:

1. A process for producing a modified polyisocyanurate foam, which process comprises reacting an organic polyisocyanate, a polyol and water in the presence of:

(a) a trimerization catalyst which is an alkali metal salt of a $C_{1-8}$ aliphatic monocarboxylic acid represented by formula (II)

$$R_6\text{—COOM} \qquad (II)$$

wherein $R_6$ is a hydrogen atom or a substituted or unsubstituted $C_{1-7}$ aliphatic hydrocarbon group, and M is an alkali metal, (b) a trimerization catalyst selected from compounds of formulas (IV), (V) or (VI)

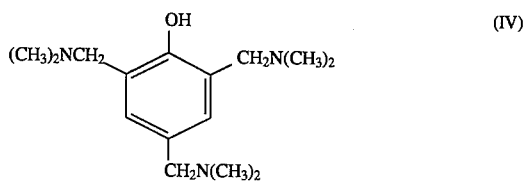

(IV)

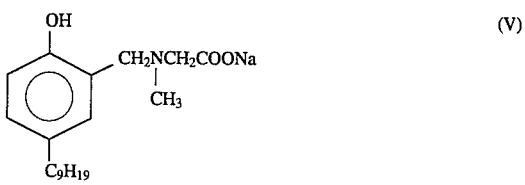

(V)

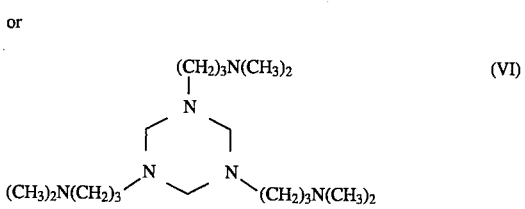

(VI)

and (c) a carbodiimidation catalyst selected from the group of compounds consisting of phosphorene oxides represented by formulas (VII) and (VIII)

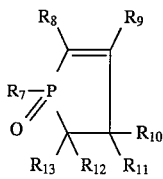 (VII)

and

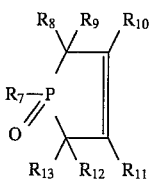 (VIII)

wherein $R_7$ is a substituted or unsubstituted alkyl, phenyl, naphthyl or benzyl group, and $R_8$, $R_9$, $R_{10}$, $R_{11}$, $R_{12}$ and $R_{13}$ are each a hydrogen atom, a chlorine atom or a $C_{1-4}$ alkyl group.

2. A process of claim 1, wherein the weight ratio of {the trimerization catalyst (a)}/{the trimerization catalyst (b)} is 0.3/1 to 20/1.

3. A process of claim 1, wherein the weight ratio of {the trimerization catalyst (a)+the trimerization catalyst (b)}/{the carbodiimidation catalyst (c)} is 1/1 to 25/1.

4. A catalyst for use in polymerization of isocyanate, which comprises:

(a) a trimerization catalyst which is an alkali metal salt of a $C_{1-8}$ aliphatic monocarboxylic acid represented by formula (II)

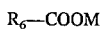 $R_6$—COOM (II)

wherein $R_6$ is a hydrogen atom or a substituted or unsubstituted $C_{1-7}$ aliphatic hydrocarbon group, and M is an alkali metal, (b) a trimerization catalyst selected from compounds of formulas (IV), (V) or (VI)

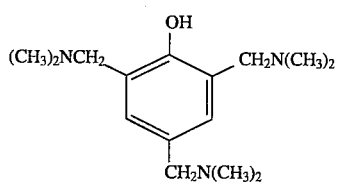 (IV)

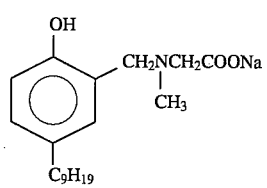 (V)

or

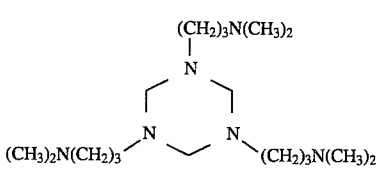 (VI)

and (c) a carbodiimidation catalyst selected from the group of compounds consisting of phosphorene oxides represented by formulas (VII) and (VIII)

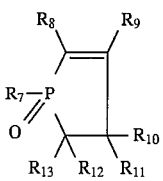 (VII)

and

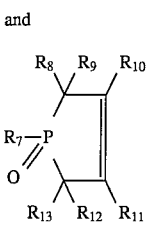 (VIII)

wherein $R_7$ is a substituted or unsubstituted alkyl, phenyl, naphthyl or benzyl group, and $R_8$, $R_9$, $R_{10}$, $R_{11}$, $R_{12}$ and $R_{13}$ are each a hydrogen atom, a chlorine atom or a $C_{1-4}$ alkyl group.

5. A process of claim 1, wherein the alkali metal salt of a $C_{1-8}$ aliphatic monocarboxylic acid, represented by formula (II) is selected from the group consisting of potassium acetate, potassium 2-ethylhexanoate, potassium propionate, potassium formate, potassium isobutyrate, potassium methacrylate, potassium sorbate, sodium acetate, sodium 2-ethylhexanoate, sodium propionate, sodium acetate, sodium formate and sodium caprylate.

6. A process of claim 5, wherein the alkali metal salt of a $C_{1-8}$ aliphatic monocarboxylic acid, represented by formula (II) is potassium acetate or potassium 2-ethylhexanoate or sodium acetate.

7. A process of claim 1, wherein the trimerization catalyst (a) has a degree of trimerization of more than 15%.

8. A process of claim 1, wherein the trimerization catalyst (b) has a degree of trimerization of not more than 15%.

9. A process of claim 1, wherein said phosphorene oxide is a compound represented by formula (VII) or (VIII) in which $R_7$ represents a $C_{1-4}$ alkyl group, a phenyl group or a benzyl group, and $R_8$, $R_9$, $R_{10}$, $R_{11}$, $R_{12}$ and $R_{13}$ each represent independently a hydrogen atom, a chlorine atom, a methyl group, an ethyl group, a propyl group, an isopropyl group or a butyl group.

10. A process of claim 1, wherein said phosphorene oxide is selected from the group consisting of 1-methylphosphorene oxide, 3-methyl-1-phenylphosphorene oxide, 3-methyl-1-benzylphosphorene oxide, 3-methyl-1-ethylphosphorene oxide, 3-methyl-1-ethylphenylphosphorene oxide, 1-phenyl-3-(4-methyl-3-pentenyl)phosphorene oxide and 1-phenyl-3-chlorophosphorene oxide.

11. A process of claim 10, wherein said phosphorene oxide is 3-methyl-1-phenylphosphorene oxide.

12. A process of claim 1, wherein said trimerization catalyst (a) is used in an amount within the range of 0.1 to 10% by weight based on the weight of said organic polyisocyanate.

13. A process of claim 1, wherein said trimerization catalyst (b) is used in an amount within the range of 0.1 to 5% by weight based on the weight of said organic polyisocyanate.

14. A process of claim 1, wherein said carbodiimidation catalyst (c) is used in an amount within the range of 0.05 to 5% by weight based on the weight of said organic polyisocyanate.

15. A process of claim 1, wherein said organic polyisocyanate is selected from the group consisting of 2,4-tolylene diisocyanate, 2,6-tolylene diisocyanate, crude tolylene diisocyanate, diphenylmethane diisocyanate, crude diphenylmethane diisocyanate, hexamethylene-1,6-diisocyanate, and hydrogenated diphenylmethane diisocyanate.

16. A process of claim 1, wherein said polyol is at least one polyol having a hydroxyl number within the range of 20 to 600 mgKOH/g.

17. A process of claim 1, wherein compounding proportions of said organic polyisocyanate, said polyol and said water are such that isocyanate index defined by NCO/OH equivalent ratio is not below 1.8.

18. A process of claim 1, wherein said water is used in an amount within the range of 0.3 to 1.8% by weight based on the total weight of said organic polyisocyanate, said polyol and said water.

19. A process of claim 1, wherein said modified polyisocyanurate foam has a free rise density of not exceeding 40 kg/m$^3$.

20. A polyol composition comprising a polyol, water and said catalyst described in claim 4.

21. A modified polyisocyanurate foam produced by said process of claim 1.

* * * * *